United States Patent
Park et al.

(10) Patent No.: US 9,013,886 B2
(45) Date of Patent: Apr. 21, 2015

(54) DISPLAY APPARATUS AND PORTABLE INFORMATION APPARATUS COMPRISING THE SAME

(75) Inventors: JaeWoo Park, Gumi-si (KR); NamDo Son, Namyul-ri (KR); SungWoo Kim, Daegu (KR); DongYong Kim, Sarncheok-si (KR); GiNam Jean, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 199 days.

(21) Appl. No.: 13/331,852

(22) Filed: Dec. 20, 2011

(65) Prior Publication Data

US 2012/0224338 A1    Sep. 6, 2012

(30) Foreign Application Priority Data

Mar. 4, 2011   (KR) .................. 10-2011-0019311

(51) Int. Cl.
*H05K 5/00* (2006.01)
*H05K 5/02* (2006.01)
*G02F 1/1333* (2006.01)

(52) U.S. Cl.
CPC ............ *H05K 5/02* (2013.01); *G02F 1/133308* (2013.01)

(58) Field of Classification Search
CPC ........ G02F 2001/133314; G02F 2001/133317; G02F 2001/133334; G02F 1/133308; G02F 1/1616; G02F 1/1681; G02F 1/1679; G02F 1/1683; G02F 1/1656; G02F 1/1654; G02F 1/1601; G02F 1/1632; G02F 1/133608
USPC .......... 361/752, 679.27–679.29, 679.58, 755, 361/759; 345/905; 349/58, 59, 60
See application file for complete search history.

(56) References Cited

U.S. PATENT DOCUMENTS

| | | | | |
|---|---|---|---|---|
| 5,479,284 A | * | 12/1995 | Watanabe et al. | 349/189 |
| 6,166,788 A | * | 12/2000 | Ha et al. | 349/58 |
| 6,525,789 B1 | * | 2/2003 | Lee | 349/58 |
| 7,535,537 B2 | * | 5/2009 | Lee et al. | 349/150 |
| 7,570,314 B2 | * | 8/2009 | Lee | 349/58 |
| 7,714,952 B2 | * | 5/2010 | Chang | 349/58 |

(Continued)

FOREIGN PATENT DOCUMENTS

| | | |
|---|---|---|
| CN | 1400859 A | 3/2003 |
| TW | 201040904 A | 11/2010 |
| TW | 201106313 A | 2/2011 |

OTHER PUBLICATIONS

Office Action issued in corresponding Taiwan Patent Application No. 100148012, mailed Dec. 20, 2014, 14 pages.

(Continued)

*Primary Examiner* — Lisa Lea Edmonds
*Assistant Examiner* — Christopher L Augustin
(74) *Attorney, Agent, or Firm* — Brinks Gilson & Lione

(57) ABSTRACT

Disclosed are a display device and a portable information apparatus including the same, which do not use a front set cover necessary for producing the display device and thus can minimize a thickness and enhance a sense of beauty with an innovative design. The display device includes a set cover, a guide frame, a display unit, a circuit disposing part, a plurality of circuit films, a PCB, and a deco cover. The circuit disposing part is prepared between one side of the guide frame and one side wall of a set side wall. The PCB is connected to the circuit films, and disposed at the circuit disposing part. The deco cover covers the circuit disposing part.

20 Claims, 6 Drawing Sheets

(56) References Cited

U.S. PATENT DOCUMENTS

| | | |
|---|---|---|
| 7,764,331 B2 * | 7/2010 | Choi et al. .................... 349/58 |
| 7,924,360 B2 * | 4/2011 | Cheng et al. ................... 349/58 |
| 7,940,287 B2 * | 5/2011 | Kim et al. ...................... 349/60 |
| 7,965,347 B2 * | 6/2011 | Ono et al. ...................... 349/58 |
| 2003/0020679 A1 | 1/2003 | Kojima et al. |
| 2006/0002064 A1 * | 1/2006 | Oooka et al. .................. 361/681 |
| 2006/0125981 A1 * | 6/2006 | Okuda .......................... 349/110 |
| 2007/0121026 A1 * | 5/2007 | Chang et al. .................... 349/58 |
| 2010/0253660 A1 | 10/2010 | Hashimoto |
| 2011/0018430 A1 | 1/2011 | Kang et al. |

OTHER PUBLICATIONS

Office Action issued in corresponding Chinese Patent Application No. 201110461258.8, mailed May 6, 2014, 19 pages.

* cited by examiner

DISPLAY APPARATUS AND PORTABLE INFORMATION APPARATUS COMPRISING THE SAME

Pursuant to 35 U.S.C. §119(a), this application claims the benefit of earlier filing date and right of priority to Korean Application 10-2011-0019311 filed on Mar. 4, 2011, the content of which is incorporated by reference herein in its entirety.

BACKGROUND

1. Field of the Invention

The present disclosure relates to a display device and a portable information apparatus including the same, and more particularly, to a display device and a portable information apparatus including the same, which do not use a front set cover necessary for producing the display device and thus can minimize a thickness and enhance a sense of beauty with an innovative design.

2. Discussion of the Related Art

Recently, flat panel display devices that can decrease weight and volume compared to Cathode Ray Tubes (CRTs) are being developed. Liquid Crystal Display (LCD) devices, Plasma Display Panels (PDPs), Field Emission Display (FED) devices, and light emitting display devices are actively being researched as flat type display devices. However, among such flat panel display devices, LCD devices are easily manufactured, have good drivability of drivers, realize a high-quality image, and thus are attracting much attention.

In terms of technology and design interesting to consumers, recently, research and development of flat panel display devices are increasingly required. Therefore, efforts are being continuously made for minimizing (slimming) the thicknesses of display devices, and research is increasingly conducted on a design with enhanced sense of beauty that can induce consumers to buy by appealing to the consumers' sense of beauty.

However, in design development for enhancing a scene of beauty or slimming of display devices that have been made to date, elements configuring a related art display device have been applied as is, and the structures of the elements have been changed. Due to these reasons, there are limitations in slimming display devices and developing the new designs of the display devices.

For example, in LCD devices of the related art, a lower case and a front case are necessarily used for receiving a liquid crystal display panel and a backlight unit, and moreover, a separate front set cover and rear set cover are additionally used for applying the LCD devices to notebook computers, monitors, mobile devices, televisions, etc. As described above, display devices of the related art necessarily use the front set cover and rear set cover as well as the lower case and front case, and consequently, there are limitations in reducing the thicknesses of LCD devices or changing the designs thereof. Particularly, the front set cover and rear set cover necessarily cover a top edge of a liquid crystal display panel. Due to this reason, the thicknesses of display devices inevitably become thicker, and moreover, the border widths of the display devices enlarge. In addition, it is difficult to realize various innovative designs due to a step height in a border portion.

BRIEF SUMMARY

A display device includes: a set cover including a receiving space which is prepared by a set plate and a set side wall; a guide frame coupled to the set cover, and placed in the receiving space; a display unit including a display panel which is adhered to the guide frame; a circuit disposing part prepared between one side of the guide frame and one side wall of the set side wall; a plurality of circuit films connected to the display panel; a Printed Circuit Board (PCB) connected to the circuit films, and disposed at the circuit disposing part; and a deco cover covering the circuit disposing part.

In another aspect of the present invention, there is provided a portable information apparatus including: a system body; and a display device rotatably coupled to the system body by a hinge part, wherein the display device includes: a set cover including a receiving space which is prepared by a set plate and a set side wall; a guide frame coupled to the set cover, and placed in the receiving space; a display unit including a display panel which is adhered to the guide frame; a circuit disposing part prepared between one side of the guide frame and one side wall of the set side wall; a plurality of circuit films connected to the display panel; a PCB connected to the circuit films and the system body, and disposed at the circuit disposing part; a supporting frame disposed at the circuit disposing part, and supporting the hinge part and the PCB; and a deco cover covering the circuit disposing part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device and a portable information apparatus including the same will be described with reference to the accompanying drawings.

Figure 1:
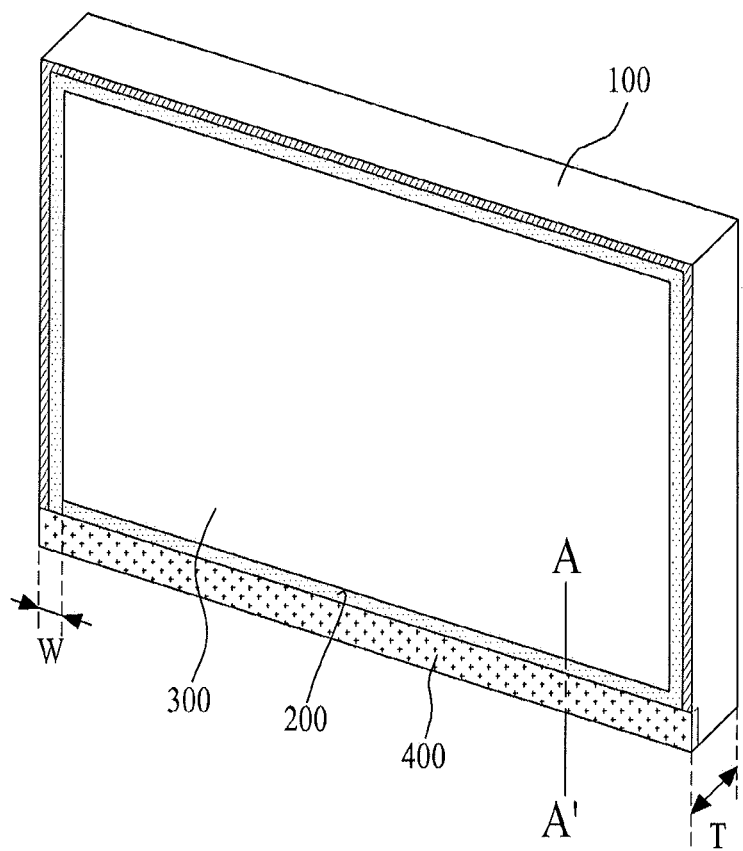
FIG. 1 is a view for describing a display device according to an embodiment of the present invention which is used in monitors, televisions, and portable information apparatuses.
Figure 2:
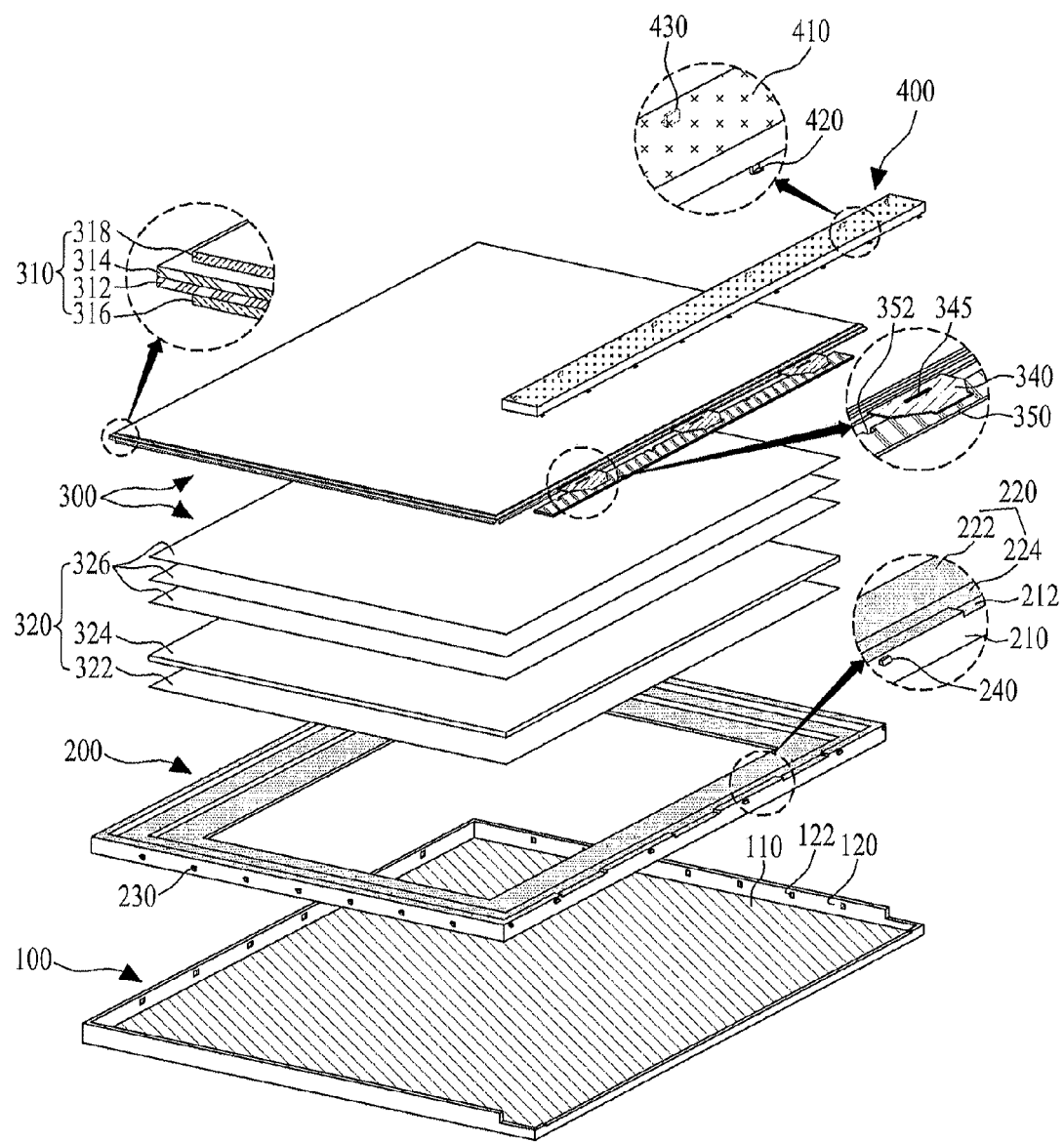
FIG. 2 is an exploded perspective view schematically illustrating a display device according to a first embodiment of the present invention.
Figure 3:
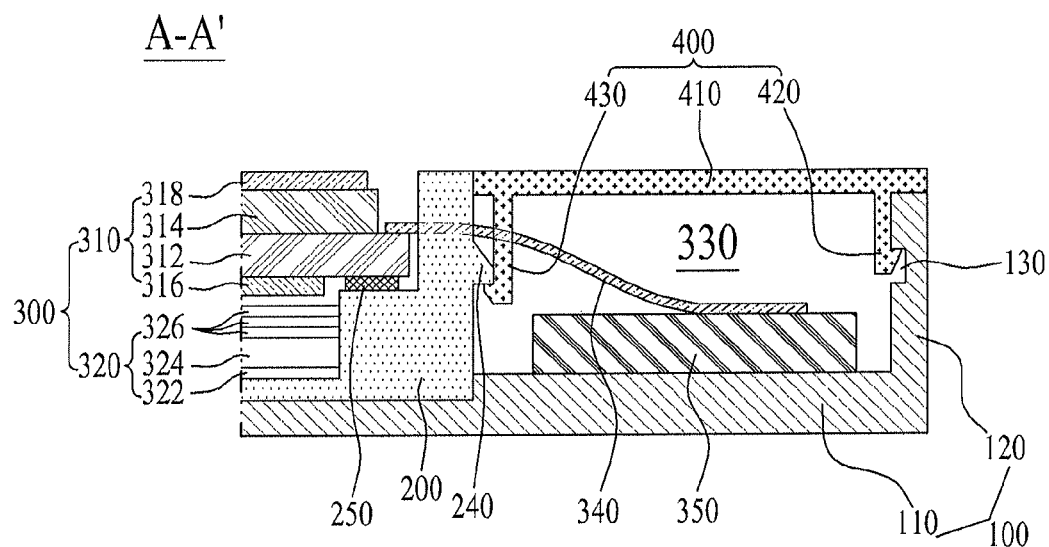
FIG. 3 is a sectional view illustrating a sectional surface taken along line A-A' of FIG. 1, and illustrates the display device according to the first embodiment of the present invention.

FIG. 1 is a view for describing a display device according to an embodiment of the present invention, which is used in monitors, televisions, and portable information apparatuses. FIG. 2 is an exploded perspective view schematically illustrating a display device according to a first embodiment of the present invention. FIG. 3 is a sectional view illustrating a sectional surface taken along line A-A' of FIG. 1, and illustrates the display device according to the first embodiment of the present invention.

Referring to FIGS. 1 to 3, the display device according to the first embodiment of the present invention includes a set cover 100 having a receiving space that is prepared by a set plate 110 and a set side wall 120, a guide frame 200 that is disposed at the set cover 100 and placed in the receiving space, a display unit 300 including a display panel 310 that is disposed at the guide frame 200, a circuit disposing part 330 that is prepared between one side of the guide frame 200 and one side wall of the set side wall 120 parallel to the one side of the guide frame 200, a plurality of circuit films 340 that are disposed at the circuit disposing part 330 to contact the display panel 310, a Printed Circuit Board (PCB) 350 that is disposed at the circuit disposing part 330 to contact the circuit films 340, and a deco cover 400 that covers the circuit disposing part 330.

The set cover 100 is formed in a tetragonal frame shape to support the guide frame 200 and surround a side of the guide frame 200, and thus acts as a product cover of a produced display device. Herein, the set cover 100 may be formed of a plastic material or a metal material, for example, formed of a metal material for enhancing a sense of beauty of the produced display device.

The set plate 110 has a flat shape, and acts as a rear cover of a produced display device The set side wall 120 is bent vertically from the set plate 110 to form the receiving space. The set side wall 120 is formed to surround the side of the guide frame 200, and acts as a side cover of the produced display device.

The guide frame 200 is placed in the receiving space that has been prepared at the set cover 100, and supports the display unit 300. For this end, the guide frame 200 includes a guide side wall 210, a supporting part 220, and a plurality of frame coupling members 230.

The guide side wall 210 is vertically formed in parallel to the set side wall 120, and surrounds a side of the display unit 300. Herein, an upper surface of the guide side wall 210 surrounds the side of the display unit 300, in which case the upper surface of the guide side wall 210 is exposed to the outside so as not to overlap with an upper edge portion of the display unit 300 and thus forms a border of the display unit 300.

On the one hand, a short side of the guide frame 200 is formed shorter than the length of a short side of the set cover 100, and thus, one side of the guide side wall 210 is separated from the set side wall 120 by a certain distance. Therefore, the circuit disposing part 330 is prepared between one side of the guide frame 200 and one side wall of the set side wall 120 parallel to the one side of the guide frame 200.

On the other hand, a plurality of concave portions 212 with the circuit films 340 disposed therein are formed at a top of one side of the guide side wall 210 adjacent to the circuit disposing part 330.

The supporting part 220 protrudes from the guide side wall 210 in the opposite direction of the set side wall 120 to have a stepped shape, and supports the display unit 300.

The frame coupling members 230 are formed at certain intervals to have a hook or protrusion shape, at sides other than one side of the guide frame 200. The frame coupling members 230 are coupled to the set side wall 120 and thus allow the guide frame 200 to be coupled to the set cover 100. In this case, a plurality of coupling grooves 122 respectively coupled to the frame coupling members 230 are formed at an inner surface of the set side wall 120.

The above-described guide frame 200 is formed to have the same color as color that is displayed when the display unit 300 is not driven. For example, the guide frame 200 may be formed in black.

The display unit 300 is placed in the supporting part 210 that is formed in a stepped shape at the guide frame 200, and surrounded by a top of the guide side wall 210. The display unit 300 includes a display panel 310.

The display panel 310 may be a liquid crystal display panel or an organic light emitting display panel that includes a facing-coupled lower substrate 312 and upper substrate 314.

In an embodiment, when the display panel 310 is the liquid crystal display panel, the display unit 300 may further include a backlight unit 320 for irradiating light on the liquid crystal display panel 310, a lower polarizer 316 adhered to the lower substrate 312, and an upper polarizer 318 adhered to entire one surface of the upper substrate 314.

Moreover, when the display panel 310 is the liquid crystal display panel, the supporting part 220 of the guide frame 200 is formed in a stepped shape, and includes a backlight disposing part 222 for supporting the backlight unit 320, and a panel disposing part 224 for supporting the liquid crystal display panel 310. In this case, the liquid crystal display panel 310 is adhered to the panel disposing part 224 by the adhesive member 250. Herein, the adhesive member 250 may be a double-sided tape or an adhesive (for example, a glue, an instant adhesive, a thermosetting adhesive, or a photocurable adhesive).

The backlight unit 320 is placed in the backlight disposing part 222 of the guide frame 200, and includes a reflective sheet 322, a light guide panel 324, and an optical member 326.

The reflective sheet 322 is disposed at a bottom of the backlight disposing part 222, and reflects light, incident from the light guide panel 324, to the liquid crystal display panel 310.

The light guide panel 324 is formed in a flat shape and guides light, incident from a light source (not shown) to a light incident surface, to the liquid crystal display panel 310. Herein, the light source may include at least one fluorescent lamp or a Light Emitting Diode (LED).

The optical member 326 is disposed on the light guide panel 324 and enhances the luminance characteristic of light traveling from the light guide panel 324 to the display panel 310. For this end, the optical member 326 may include at least two of a lower diffusive sheet, a lower prism sheet, an upper prism sheet, and an upper diffusive sheet.

In another embodiment, when the display panel 310 is the organic light emitting display panel, the display unit 300 may further include the upper polarizer 318 adhered to entire one surface of the upper substrate 314.

The circuit films 340 contacts the display panel 310 and is disposed at the concave portions 212 and the circuit disposing part 330. Herein, the circuit films 340 may be adhered to the lower substrate 110 and PCB 350 of the display panel 310 by a Tape Automated Bonding (TAB) process, and may be a Tape Carrier Package (TCP) or Chip On Flexible Board/Chip On Film (COF). Therefore, the display panel 310 is electrically connected to the PCB 350 through the circuit films 340.

A data driving Integrated Circuit (IC) 345 for supplying data signals to the display panel 310 are mounted on each of the circuit films 340. Furthermore, a gate driving circuit (not shown) for supplying a gate (scan) signal to the display panel 310 is built in the lower substrate 312 of the display panel 310.

The PCB 350 is electrically connected to the circuit films 340 and disposed at the set plate 110 corresponding to the circuit disposing part 330. A timing controller (not shown) for controlling driving of the display panel 310, various power source circuits (not shown), a memory element (not shown), etc. are mounted on the PCB 350.

The deco cover 400 is coupled to one side wall of the set side wall 120 and one side of the guide frame 200 to cover a space (namely, the circuit disposing part 330) between the one side of the guide frame 200 and the one side wall of the set side wall 120 parallel to the one side of the guide frame 200, thereby protecting the PCB 350 and the circuit films 340. For this end, the deco cover 400 includes a cover plate 410, and a plurality of first and second coupling members 420 and 430.

The cover plate 410 covers the circuit disposing part 330 so as not to expose the circuit films 340 and PCB 350, disposed at the circuit disposing part 330, to the outside.

The first coupling members 420 are formed at certain intervals, at one side of the cover plate 410 and coupled to one side wall of the set side wall 120. Herein, each of the first coupling members 420 is formed vertically from one side rear surface of the cover plate 410 to have a protrusion or hook shape. Furthermore, the set cover 100 includes a plurality of hook coupling grooves 130 that are formed at one side wall of the set side wall 120 to be coupled to the first coupling members 420.

The second coupling members 430 are form at the other side of the cover plate 410 to correspond to respective gaps between the circuit films 340, and coupled to the guide side wall 210 of one side of the guide frame 200. Herein, each of the second coupling members 430 is formed vertically from the other side rear surface of the cover plate 410 to have a protrusion or hook shape. Furthermore, the guide frame 200 includes a plurality of third coupling members 240 that are formed at one side of the guide side wall 210 to be coupled to the second coupling members 430.

The PCB 350 further includes a plurality of through holes 352 which are formed in correspondence with the second coupling members 430 and through which the second coupling members 430 respectively pass in assembling the deco cover 400.

In the first embodiment of the present invention, the display unit 300 is adhered to the guide frame 200 by the adhesive member 250, the guide frame 200 is coupled to the set cover 100, and thus, a lower case and upper case of the related art and a front cover of each product are not applied to the first embodiment. Accordingly, an entire thickness T of the display device can be reduced, a width W of a front frame portion can be minimized, and thus, provided can be the display device having an innovative design with enhanced sense of beauty.

Moreover, in the first embodiment of the present invention, the circuit disposing part 330 is prepared at one side of the set cover 100, and the deco cover 400 covers the circuit film 340 and PCB 350 that are disposed at the circuit disposing part 330. Accordingly, the circuit film 340 and PCB 350 are prevented from being exposed to the outside, and thus, design limitations that are caused by not using an upper case of the related art and a front cover of each product can be solved.

Figure 4:
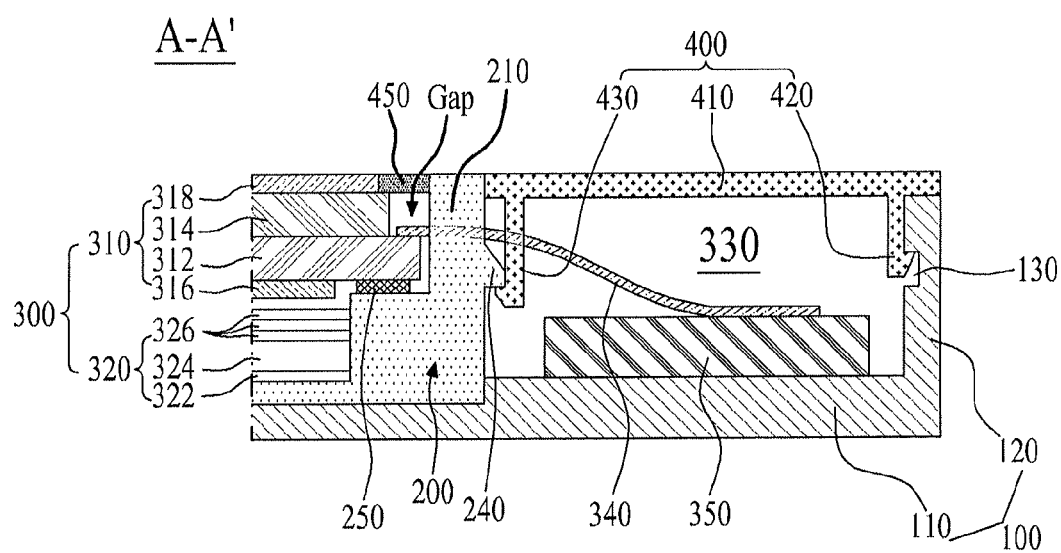
FIG. 4 is a sectional view illustrating a sectional surface taken along line A-A' of FIG. 1, and illustrates a display device according to a second embodiment of the present invention.

FIG. 4 is a sectional view illustrating a sectional surface taken along line A-A' of FIG. 1, and illustrates a display device according to a second embodiment of the present invention.

Referring to FIGS. 1, 2 and 4, the display device according to the second embodiment of the present invention includes the set cover 100, the guide frame 200, the display unit 300, the circuit disposing part 330, the plurality of circuit films 340, the PCB 350, the deco cover 400, and a sealing member 450. Except that the display device of the second embodiment further includes the sealing member 450 compared to the first embodiment, the second embodiment having such a configuration has the same configuration as that of the first embodiment of FIGS. 1 to 3, and thus, the above description of the first embodiment is applied to the same elements. Like reference numerals refer to like elements throughout.

First, in manufacturing the display unit, namely, the display panel 310 and the guide frame 200, since a process error occurs in manufacturing, a gap due to the process error is formed between a side of the display panel 310 and the guide side wall 210 of the guide frame 200.

The sealing member 450 seals the gap between the side of the display panel 310 and the guide side wall 210, and thus prevents foreign substances such as dust from being penetrated into the inside through the gap and prevents a sense of beauty from being degraded by the gap. Herein, the sealing member 450 is formed in the same color as that of the guide frame 200 such that an aesthetic effect is not degraded by a color difference between the sealing member 450 and the guide frame 200.

A sealing member 450 according to an embodiment may be formed in a ring or flat shape. The sealing member 450 is inserted into the gap between the side of the display panel 310 and the guide side wall 210, and thus seals the gap.

A sealing member 450 according to another embodiment may be a silicon resin or an ultraviolet (UV)-setting resin. The sealing member 450 is charged into the gap between the side of the display panel 310 and the guide side wall 210 by a dispenser (not shown), and seals the gap by being hardened.

The display device of the second embodiment can provide the same effect as that of the display device of the first embodiment. Also, in the second embodiment, the sealing member 450 seals the gap between the side of the display panel 310 and the guide side wall 210, and thus prevents foreign substances such as dust from being penetrated into the inside through the gap and prevents a sense of beauty from being degraded by the gap.

Figure 5:
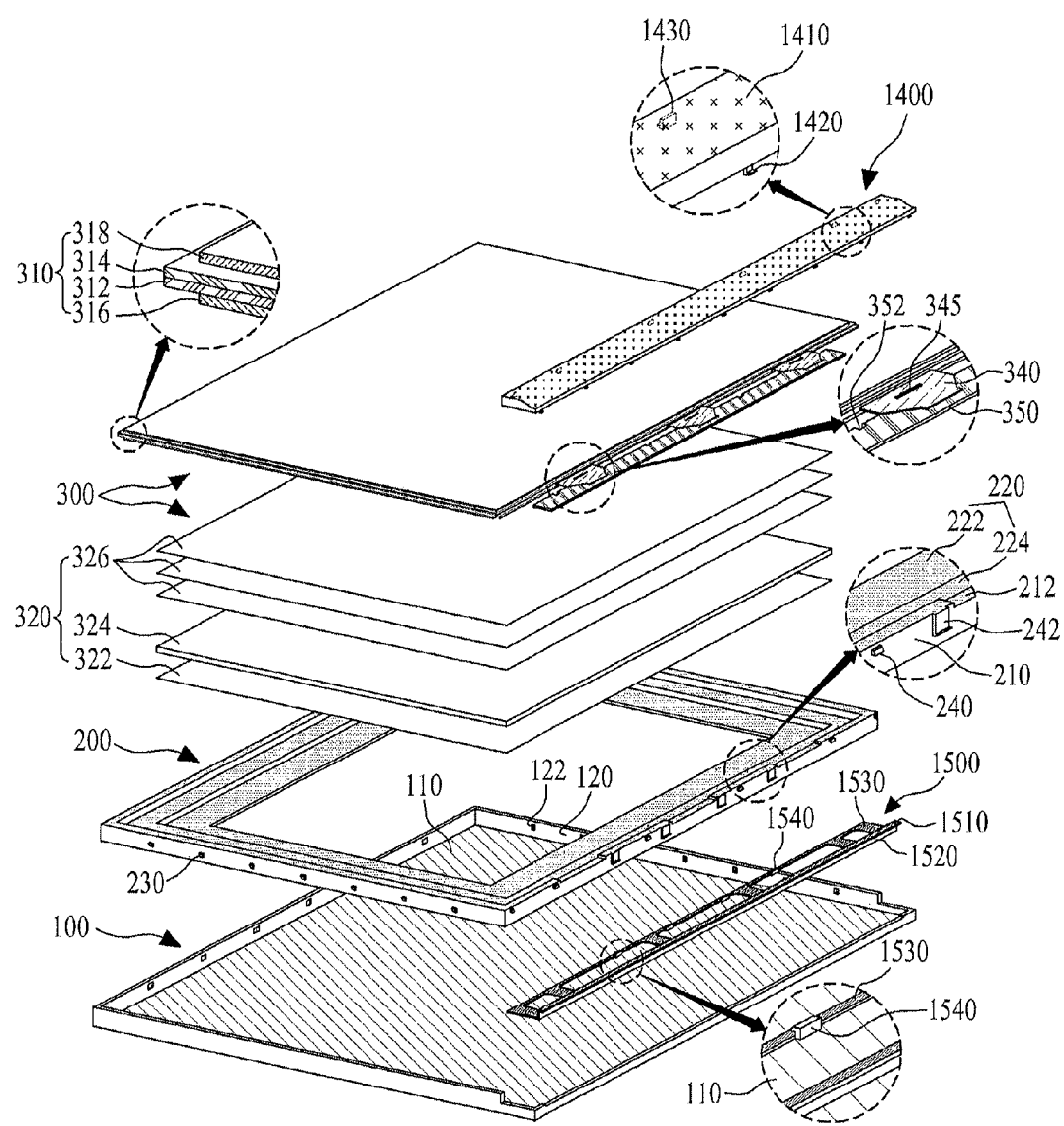
FIG. 5 is an exploded perspective view schematically illustrating a display device according to a third embodiment of the present invention.
Figure 6:
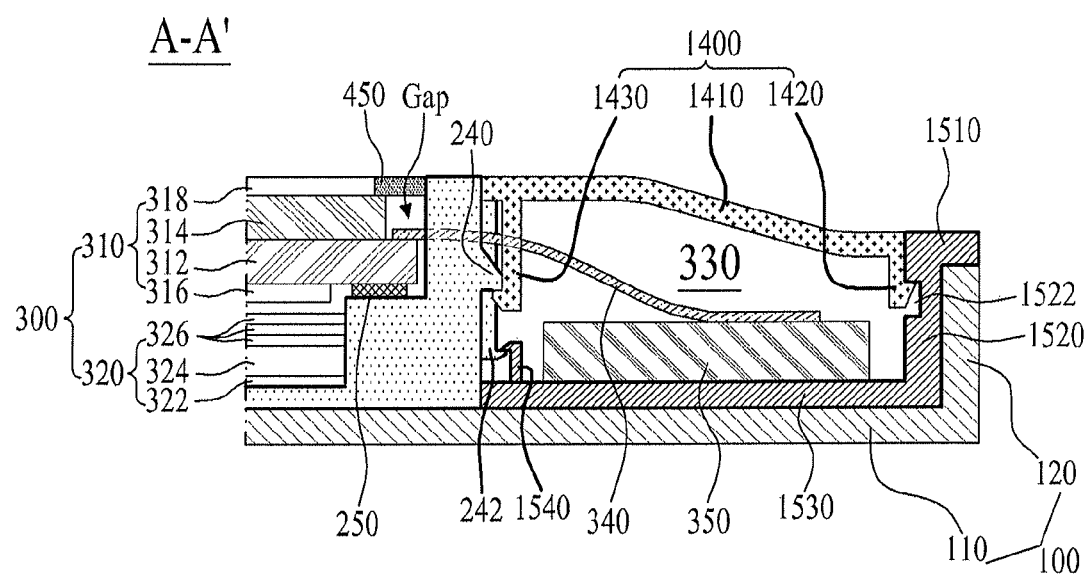
FIG. 6 is a sectional view illustrating a sectional surface taken along line A-A' of FIG. 1, and illustrates the display device according to the third embodiment of the present invention.

FIG. 5 is an exploded perspective view schematically illustrating a display device according to a third embodiment of the present invention. FIG. 6 is a sectional view illustrating a sectional surface taken along line A-A' of FIG. 1, and illustrates the display device according to the third embodiment of the present invention.

Referring to FIGS. 1, 5 and 6, the display device according to the third embodiment of the present invention includes the set cover 100, the guide frame 200, the display unit 300, the circuit disposing part 330, the plurality of circuit films 340, the PCB 350, a deco cover 1400, and a supporting frame 1500. Except that one side of the guide frame 200 is fixed by the supporting frame 1500 and the deco cover 1400 is coupled to the supporting frame 1500 and the guide frame 200, the third embodiment having such a configuration has the same configuration as that of the first embodiment of FIGS. 1 to 3, and thus, the above description of the first embodiment is applied to the same elements. Like reference numerals refer to like elements throughout.

First, the supporting frame 1500 is disposed at the set plate 110 and set side wall 120 corresponding to the circuit disposing part 330 so as to be coupled to the deco cover 1400. In this case, the supporting frame 1500 is adhered to the set plate 110 and set side wall 120 corresponding to the circuit disposing part 330 by an adhesive member such as a double-sided tape or an adhesive. The supporting frame 1500 supports the PCB 350 that is disposed at the circuit disposing part 330. For this end, the supporting frame 1500 includes a front plate 1510, a supporting side wall 1520, a supporting plate 1530, and a plurality of first coupling protrusions 1540.

The front plate 1510 is disposed at a top of the set side wall 120 adjacent to the circuit disposing part 330.

The supporting side wall 1520 is bent from the front plate 1510 to contact an inner wall of the set side wall 120 adjacent to the circuit disposing part 330. The supporting side wall 1520 may be adhered to the inner wall of the set side wall 120 by the adhesive member.

The supporting plate 1530 is bent from the supporting side wall 1520 to be disposed at the set plate 110 corresponding to the circuit disposing part 330. The supporting plate 1530 is adhered to the set plate 110 corresponding to the circuit disposing part 330 by the adhesive member. Herein, a certain shape of blank may be formed at the supporting plate 1530, for reducing a weight.

The first coupling protrusions 1540 protrude vertically from the supporting plate 1530 adjacent to one side of the guide frame 200 to have a hook shape. The first coupling protrusions 1540 are coupled to one side of the guide frame 200 disposed at the set plate 110, and thus fix the guide frame 200.

The guide frame 200 further includes a plurality of second coupling protrusions 242 that are formed at one side of the guide side wall 210 to be coupled to the first coupling protrusions 1540. Therefore, the guide frame 200 is coupled to the set cover 100 by coupling of the frame coupling members 230 (which are formed at an outer side of the guide side wall 210 other than the guide side wall 210 adjacent to the circuit disposing part 330) and the coupling grooves 122 formed at an inner surface of the set side wall 120, and coupled to the supporting frame 1500 by coupling of the first coupling protrusions 1540 and the second coupling protrusions 242.

The deco cover 1400 is coupled to the supporting side wall 1520 of the supporting frame 1500 and one side of the guide frame 200 to cover the circuit disposing part 330, and thus protects the PCB 350 and circuit films 340 disposed at the circuit disposing part 330. For this end, the deco cover 1400 includes a cover plate 1410, a plurality of first coupling members 1420, and a plurality of second coupling members 1430.

The cover plate 1410 covers the circuit disposing part 330 so as not to expose the PCB 350 and circuit films 340 disposed at the circuit disposing part 330 to the outside.

The first coupling members 1420 are formed at certain intervals, at one side of the cover plate 1410 and coupled to the supporting side wall of the supporting frame 1500. Herein, each of the first coupling members 1420 is formed vertically from one side rear surface of the cover plate 1410 to have a protrusion or hook shape. Furthermore, the supporting frame 1500 includes a plurality of hook coupling grooves 1522 that are formed at an inner side wall of the supporting side wall 1520 to be coupled to the first coupling members 1420.

The second coupling members 1430 are form at the other side of the cover plate 1410 to correspond to respective gaps between the circuit films 340, and coupled to the guide side wall 210 of one side of the guide frame 200. Herein, each of the second coupling members 1430 is formed vertically from the other side rear surface of the cover plate 1410 to have a protrusion or hook shape. Furthermore, the guide frame 200 includes a plurality of third coupling members 240 that are formed at one side of the guide side wall 210 to be coupled to the second coupling members 1430.

On the one hand, the second coupling members 1430 may be coupled to the coupling protrusions 1540 that are formed at the supporting frame 1500, instead of the third coupling member 240 of the guide frame 200. In this case, the deco cover 1400 is coupled only to the supporting frame 1500, and thus, the second coupling protrusions 242 formed at the guide frame 200 are not provided.

On the other hand, the display device of the third embodiment may further include a sealing member 450 that seals the gap between the side of the display panel 310 and the guide side wall 210.

The sealing member 450 seals the gap between the side of the display panel 310 and the guide side wall 210, and thus prevents foreign substances such as dust from being penetrated into the inside through the gap and prevents a sense of beauty from being degraded by the gap. Herein, the sealing member 450 is formed in the same color as that of the guide frame 200 such that an aesthetic effect is not degraded by a color difference between the sealing member 450 and the guide frame 200.

The display device of the third embodiment can provide the same effect as that of the display device of the first embodiment. Also, in the third embodiment, by coupling the guide frame 200 to the set cover 100 and the supporting frame 1500, a coupling strength of the guide frame 200 can increase.

Figure 7:
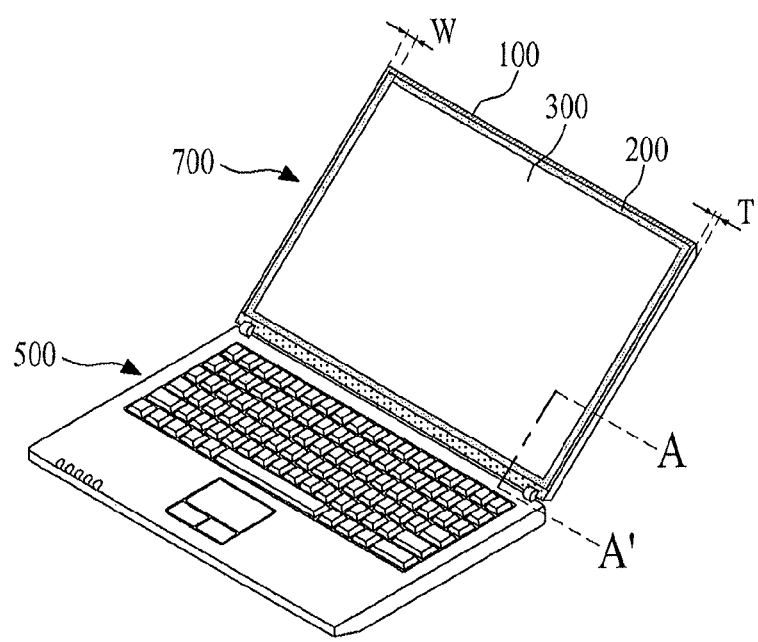
FIG. 7 is a view schematically illustrating a portable information apparatus according to an embodiment of the present invention.
Figure 8:
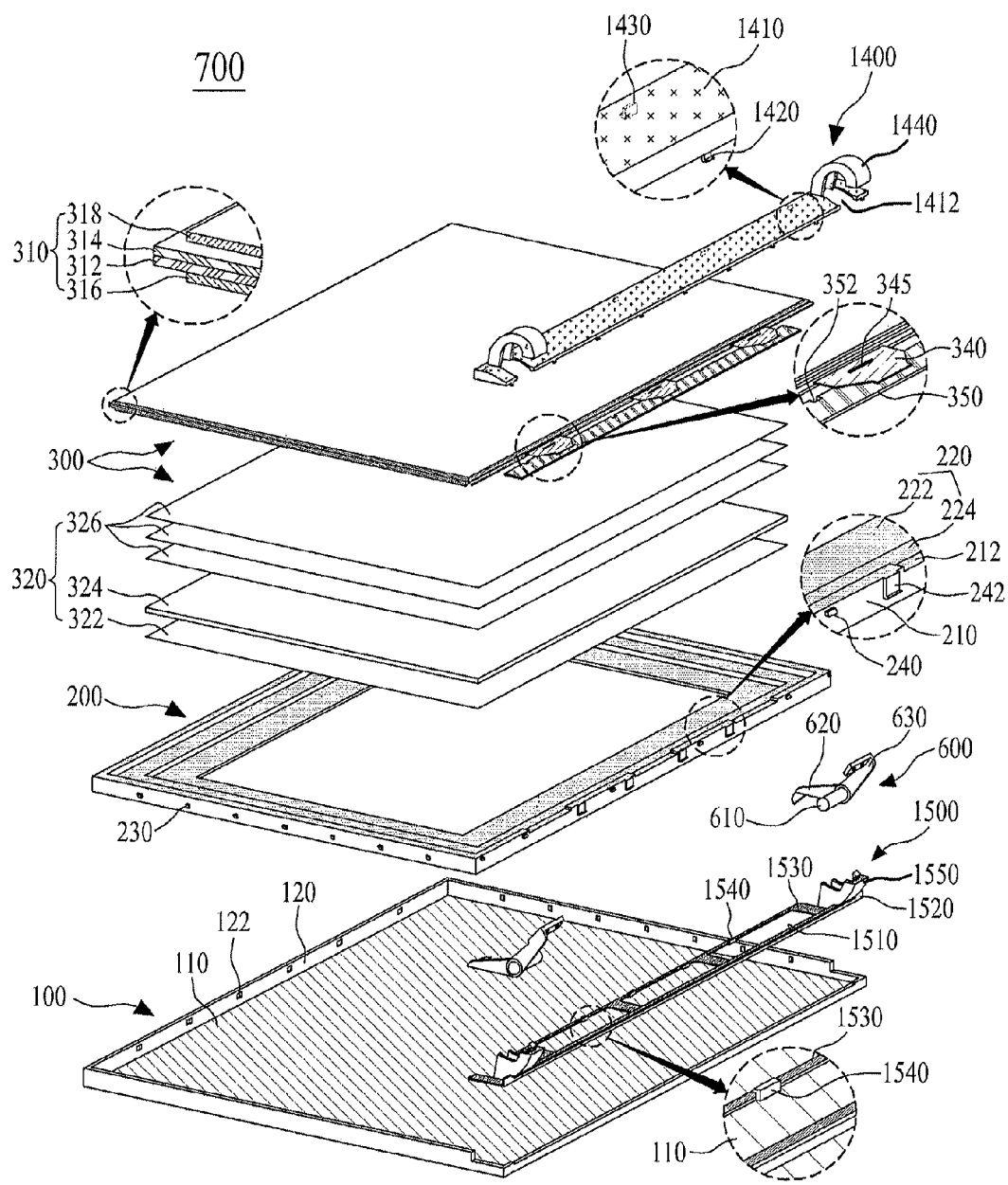
FIG. 8 is an exploded perspective view schematically illustrating the display device of FIG. 7.

FIG. 7 is a view schematically illustrating a portable information apparatus according to an embodiment of the present invention. FIG. 8 is an exploded perspective view schematically illustrating the display device of FIG. 7.

Referring to FIGS. 7 and 8, the portable information apparatus according to an embodiment of the present invention includes a system body 500, and a display device 700 that is rotatably coupled to the system body 500 by a hinge part 600.

The system body 500 includes a control circuit for processing various information, for example, a Central Processing Unit (CPU), a graphic card for processing data according to control of the CPU, various storage mediums, and a power supply. The system body 500 processes various information and displays certain information on the display device 700.

The hinge part 600 is disposed between one side of the system body 500 and a lower portion of the display device 700 such that display device 700 is rotatably coupled to the system body 500. For this end, the hinge part 600 includes a hinge axis 610, and first and second brackets 620 and 630 that are rotatably disposed at one side of the hinge axis 610.

The hinge axis 610 and the first bracket 620 are coupled to the display device 700, and the second bracket 630 is coupled to the system body 500.

The display device 700 includes; the set cover 100 having a receiving space that is prepared by the set plate 110 and the set side wall 120; the guide frame 200 that is disposed at the set cover 100 and placed in the receiving space; the display unit 300 including the display panel 310 that is disposed at the guide frame 200; the circuit disposing part 300 that is prepared between one side of the guide frame 200 and the one side wall of the set side wall 120 parallel to the one side of the guide frame 200; the PCB 350 that is disposed at the circuit disposing part 330 to be connected to the circuit films 340 and the system body 500; the supporting frame 1500 that is disposed at the circuit disposing part 330 and one side wall of the set side wall 120 and supports the hinge part 600 and the PCB 350; and the deco cover 1400 that covers the circuit disposing part 330. Except for the supporting frame 1500 and the deco cover 1400, the display device 700 having such a configuration has the same configuration as that of the third embodiment of FIGS. 5 and 6, and thus, the above description of the third embodiment is applied to the display device 700. Like reference numerals refer to like elements throughout.

First, the supporting frame 1500 is disposed at the set plate 110 and set side wall 120 corresponding to the circuit disposing part 330 so as to be coupled to the deco cover 1400. In this case, the supporting frame 1500 is adhered to the set plate 110 and set side wall 120 corresponding to the circuit disposing part 330 by an adhesive member such as a double-sided tape or an adhesive. The supporting frame 1500 supports the PCB 350 that is disposed at the circuit disposing part 330. For this end, the supporting frame 1500 includes the front plate 1510, the supporting side wall 1520, the supporting plate 1530, the plurality of first coupling protrusions 1540, and a hinge supporting part 1550. Except for the hinge supporting part 1550, the supporting frame 1500 having such a configuration has the same configuration as that of the third embodiment, and thus, the above description of the third embodiment is applied to the supporting frame 1500. Like reference numerals refer to like elements throughout.

The hinge supporting part 1550 is provided at both edge portions of the supporting plate 1530 to have a certain height in correspondence with the hinge part 600 and supports the hinge part 600. In this case, the hinge axis 610 of the hinge part 600 is rotatably disposed at the hinge supporting part 1550, and the first bracket 620 of the hinge part 600 is coupled to the set plate 110. The second bracket 630 of the hinge part 600 is coupled to the system body 500.

The deco cover 1400 is coupled to the supporting side wall 1520 of the supporting frame 1500 and one side of the guide frame 200 to cover the circuit disposing part 330, and thus protects the PCB 350 and circuit films 340 disposed at the circuit disposing part 330. For this end, the deco cover 1400 includes a cover plate 1410, a plurality of first coupling members 1420, a plurality of second coupling members 1430, and a hinge cover 1440.

The cover plate 1410 covers the circuit disposing part 330 so as not to expose the PCB 350 and circuit films 340 disposed at the circuit disposing part 330 to the outside. In this case, a through portion 1412 through which the hinge supporting part 1550 passes is formed at the cover plate 1410 corresponding to the hinge supporting part 1550 of the supporting frame 1500.

The first coupling members 1420 are formed at certain intervals, at one side of the cover plate 1410 and coupled to the supporting side wall of the supporting frame 1500. Herein, each of the first coupling members 1420 is formed vertically from one side rear surface of the cover plate 1410 to have a protrusion or hook shape. Furthermore, the supporting frame 1500 includes a plurality of hook coupling grooves 1522 that are formed at an inner side wall of the supporting side wall 1520 to be coupled to the first coupling members 1420.

The second coupling members 1430 are form at the other side of the cover plate 1410 to correspond to respective gaps between the circuit films 340, and coupled to the guide side wall 210 of one side of the guide frame 200. Herein, each of the second coupling members 1430 is formed vertically from the other side rear surface of the cover plate 1410 to have a protrusion or hook shape. Furthermore, the guide frame 200 includes a plurality of third coupling members 240 that are formed at one side of the guide side wall 210 to be coupled to the second coupling members 1430.

On the one hand, the second coupling members 1430 may be coupled to the coupling protrusions 1540 that are formed at the supporting frame 1500, instead of the third coupling member 240 of the guide frame 200. In this case, the deco cover 1400 is coupled only to the supporting frame 1500, and thus, the second coupling protrusions 242 formed at the guide frame 200 are not provided.

The hinge cover 1440 is provided at the cover plate 1410 in correspondence with the hinge supporting part 1550 that is provided at the supporting frame 1500, and coupled to the hinge supporting part 1550. Herein, the hinge supporting part 1550 and the hinge cover 1440 are coupled with each other by a hook. Therefore, the hinge axis 610 of the hinge part 600 and the first bracket 620 are covered by the hinge cover 1440, and the second bracket 630 of the hinge part 600 is exposed to the outside to be coupled to the system body 500.

Furthermore, the display device 700 may further include a sealing member 450 that seals the gap between the side of the display panel 310 and the guide side wall 210.

The sealing member 450 seals the gap between the side of the display panel 310 and the guide side wall 210, and thus prevents foreign substances such as dust from being penetrated into the inside through the gap and prevents a sense of beauty from being degraded by the gap. Herein, the sealing member 450 is formed in the same color as that of the guide frame 200 such that an aesthetic effect is not degraded by a color difference between the sealing member 450 and the guide frame 200.

The portable information apparatus according to an embodiment of the present invention may be a notebook computer. In this case, a thickness of the display device of the notebook computer and a width W of a front frame portion can be minimized, and thus, provided can be the notebook computer having an innovative design with enhanced sense of beauty.

According to the embodiments of the present invention, the display unit is adhered to the guide frame by the adhesive member, the guide frame is coupled to the set cover, and thus, the lower case and upper case of the related art and the front cover of each product are not applied to the embodiments. Accordingly, the entire thickness of the display device can be reduced, the width of the front frame portion can be minimized, and thus, provided can be the display device having an innovative design with enhanced sense of beauty.

Moreover, by covering the circuit film and PCB with the deco cover, the circuit film and PCB are prevented from being exposed to the outside, and thus, design limitations that are caused by not using the upper case of the related art and the front cover of each product can be solved.

Moreover, by sealing the gap between the guide side wall and the side of the display panel with the sealing member, foreign substances such as dust can be prevented from being penetrated into the inside through the gap, and a sense of beauty can be prevented from being degraded due to the gap.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:
1. A display device comprising:
a set cover comprising a receiving space which is prepared by a set plate and a set side wall;

a guide frame coupled to the set cover, and placed in the receiving space, one outermost side of the guide frame being separated from one side wall of the set side wall by a certain distance;

a display unit comprising a display panel which is adhered to the guide frame;

a circuit disposing part prepared on the set plate in correspondence with space between the one outermost side of the guide frame and the one side wall of the set side wall parallel to each other;

a plurality of circuit films connected to the display panel;

a Printed Circuit Board (PCB) connected to the circuit films, and disposed at the set plate in correspondence with the circuit disposing part; and a deco cover covering the circuit disposing part and the display panel the deco cover comprising a plurality of coupling members, wherein each coupling member is in correspondence with a respective gap between the circuit films connected to the display panel, wherein the circuit disposing part and the Printed Circuit Board (PCB) are not overlapped with the guide frame.

2. The display device of claim 1, wherein a top of the guide frame is exposed to the outside to form a border of the display panel.

3. The display device of claim 1, wherein the deco cover is coupled to the one side wall of the set side wall and the one outermost side of the guide frame.

4. The display device of claim 3, wherein the plurality of coupling members of the deco cover is a plurality of first coupling members, and wherein the deco cover further comprises:

a cover plate covering the circuit disposing part; and a plurality of second coupling members at one side of the cover plate, the plurality of second coupling members coupled to the one side wall of the set side wall, and the plurality of first coupling members are at the other side of the cover plate, and coupled to the one outermost side of the guide frame.

5. The display device of claim 1, further comprising a supporting frame disposed at the set cover in correspondence with the circuit disposing part, and supporting the PCB.

6. The display device of claim 5, wherein the supporting frame is coupled to the set cover by an adhesive member.

7. The display device of claim 5, wherein the supporting frame comprises:

a supporting plate disposed at the circuit disposing part, and supporting the PCB; and a supporting side wall bent from one side of the supporting plate, and disposed at the one side wall of the set side wall.

8. The display device of claim 7, wherein the supporting frame further comprises a plurality of coupling protrusions formed at the supporting plate, and coupled to the one outermost side of the guide frame or the deco cover.

9. The display device of claim 8, wherein the plurality of coupling members of the deco cover is a plurality of first coupling members, and wherein the deco cover further comprises:

a cover plate covering the circuit disposing part; and a plurality of second coupling members at one side of the cover plate, the second coupling members coupled to the supporting side wall of the supporting frame, and the first coupling members are at the other side of the cover plate, coupled to the one outermost side of the guide frame or the coupling protrusions.

10. The display device of claim 1, further comprising a sealing member sealing a space between a side of the guide frame and a side of the display panel.

11. A portable information apparatus comprising:

a system body; and a display device rotatably coupled to the system body by a hinge part, wherein the display device comprises:

a set cover comprising a receiving space which is prepared by a set plate and a set side wall;

a guide frame coupled to the set cover, and placed in the receiving space, one outermost side of the guide frame being separated from one side wall of the set side wall by a certain distance;

a display unit comprising a display panel which is adhered to the guide frame;

a circuit disposing part prepared on the set plate in correspondence with space between the one outermost side of the guide frame and the one side wall of the set side wall parallel to each other;

a plurality of circuit films connected to the display panel;

a Printed Circuit Board (PCB) connected to the circuit films and the system body, and disposed at the circuit disposing part;

a supporting frame disposed at the set plate in correspondence with the circuit disposing part, and supporting the hinge part and the PCB; and a deco cover coupled to the display panel to cover the circuit disposing part, wherein the deco cover comprises a plurality of coupling members coupled to the display panel at corresponding respective gaps between the plurality of circuit films, wherein the circuit disposing part and the Printed Circuit Board (PCB) are not overlapped with the guide frame.

12. The portable information apparatus of claim 11, wherein a top of the guide frame is exposed to the outside to form a border of the display panel.

13. The portable information apparatus of claim 11, wherein the supporting frame comprises:

a supporting plate disposed to the set cover in correspondence with the circuit disposing part, and supporting the PCB;

a supporting side wall bent from one side of the supporting plate, and disposed at the one side wall of the set side wall;

a plurality of coupling protrusions formed at the supporting plate, and coupled to the guide frame or the deco cover; and a hinge supporting part formed at the supporting plate, and supporting the hinge part.

14. The portable information apparatus of claim 13, wherein the plurality of coupling members is a plurality of first coupling members, and wherein the deco cover further comprises:

a cover plate covering the circuit disposing part;

a plurality of second coupling members at one side of the cover plate, and coupled to the supporting side wall of the supporting frame, wherein the plurality of first coupling members formed at the other side of the cover plate, and coupled to the coupling protrusions or the one outermost side of the guide frame; and a hinge cover formed at the cover plate, and coupled to the hinge supporting part of the supporting frame with the hinge part therebetween.

15. The portable information apparatus of claim 11, wherein the display device comprises a sealing member sealing a space between a side of the guide frame and a side of the display panel.

16. The portable information apparatus of claim 11, wherein the deco cover is coupled to the display panel by snapping the coupling members of the deco cover into the corresponding respective gaps within the plurality of circuit films.

17. The portable information apparatus of claim 16, wherein the coupling members of the deco cover are coupled with the one side wall of the set side wall.

18. A display device comprising:
- a set cover comprising a set plate and a set side wall;
- a guide frame coupled to the set cover, wherein a circuit disposing gap is left on the set plate in between a single side of the guide frame and a side wall of the set side wall, the side wall being the adjacent side wall to the side of the guide frame;
- a display unit comprising a display panel adhered to the guide frame;
- a plurality of circuit films connected to the display panel;
- a Printed Circuit Board (PCB) connected to the circuit films, and disposed at the circuit disposing gap; and
- a deco cover covering the circuit disposing gap the deco cover comprising a plurality of coupling members, wherein the deco cover is coupled to the guide frame using the coupling members, wherein each coupling member is coupled to the guide frame in a gap between the circuit films.

19. The display device of claim 18, wherein the deco cover is further coupled to the set cover using the coupling members.

20. The display device of claim 19, wherein the coupling members protrude from the deco cover and the set cover comprises coupling grooves to be coupled with the coupling members.

* * * * *